E. POSSON.
CAR VENTILATOR.
APPLICATION FILED FEB. 28, 1908.

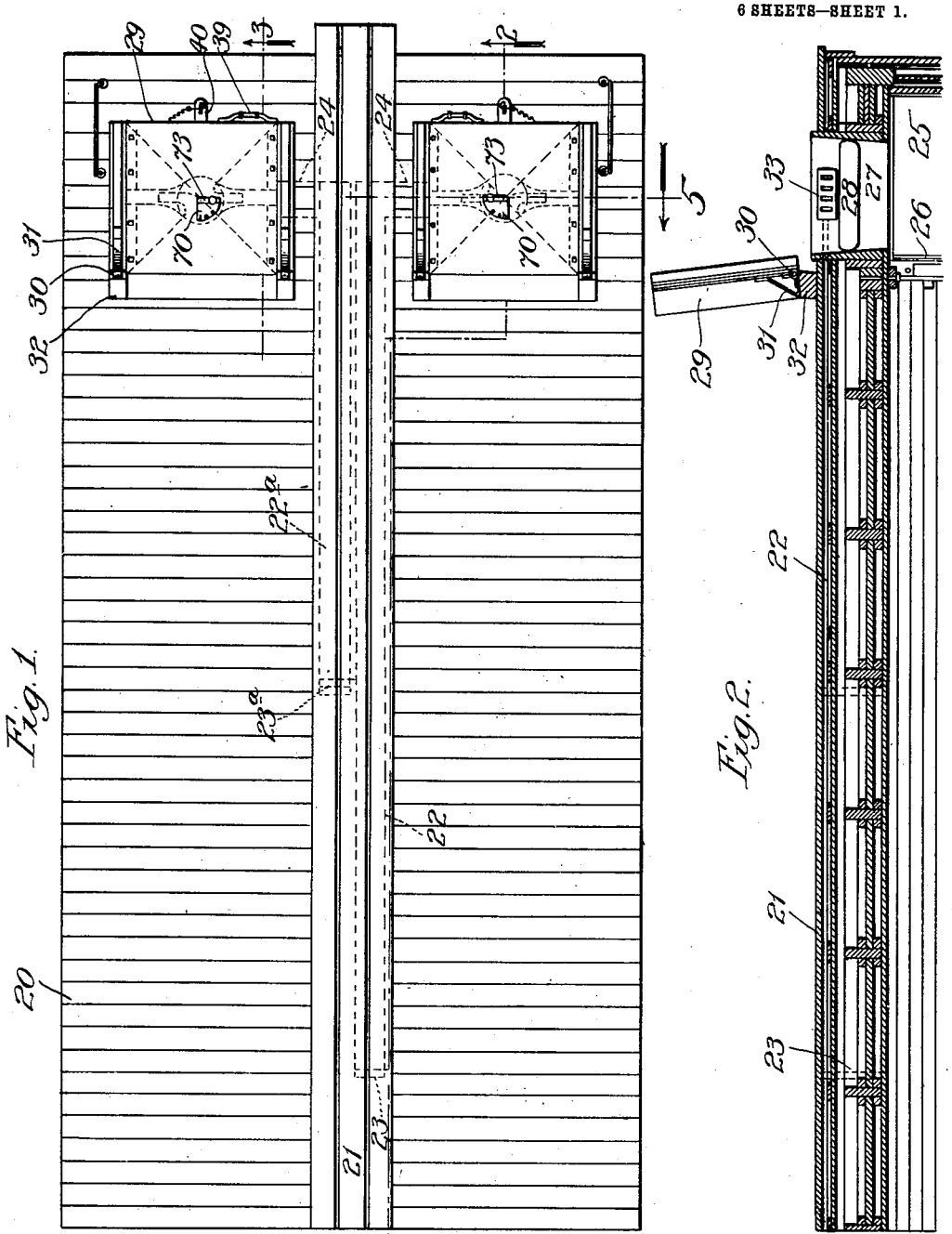

955,543.

Patented Apr. 19, 1910.

6 SHEETS—SHEET 2.

Witnesses:
John Enders
Chas. H. Buell

Inventor:
Edward Posson
By Sheridan & Wilkinson
Attys.

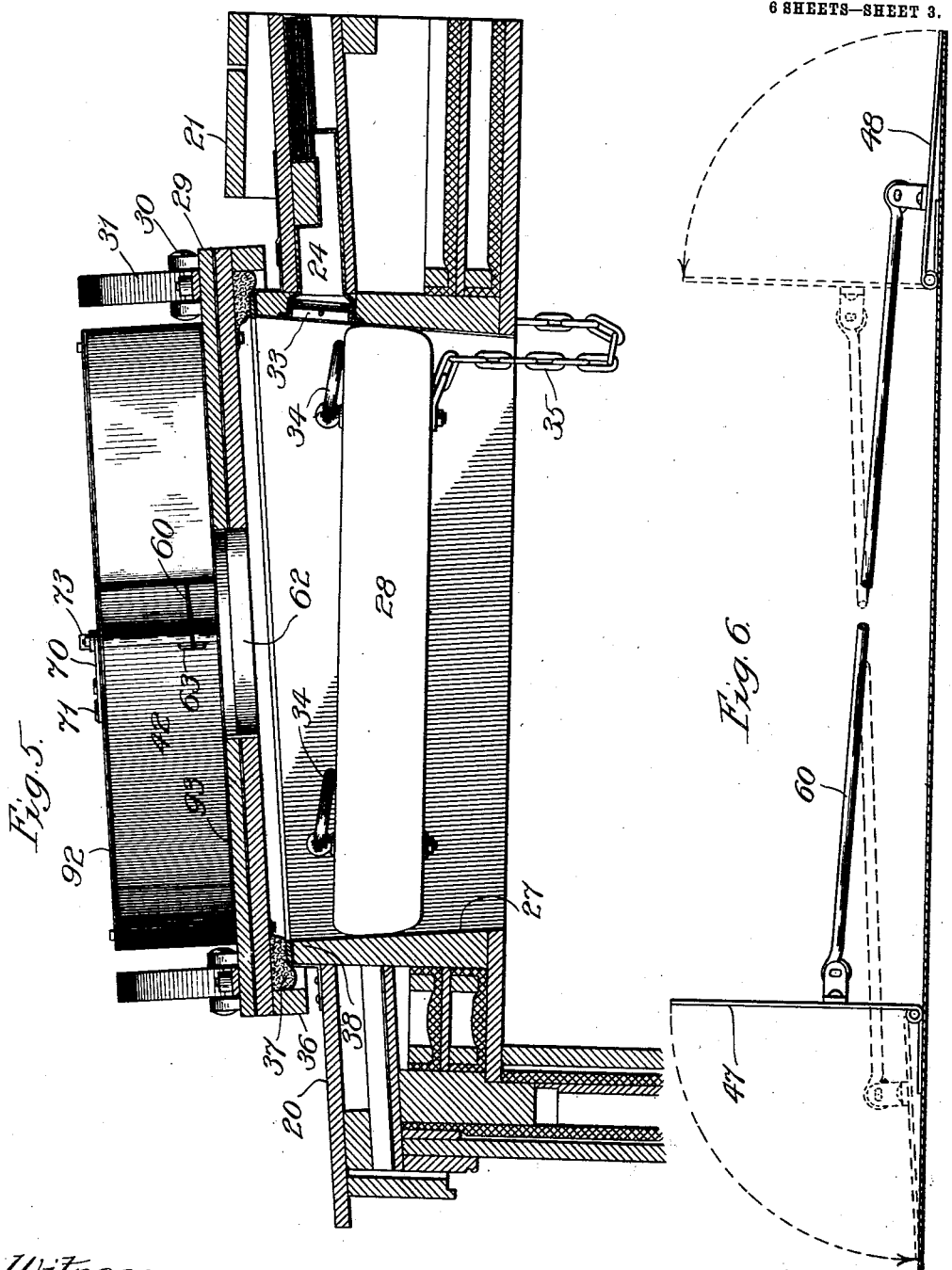

E. POSSON.
CAR VENTILATOR.
APPLICATION FILED FEB. 28, 1908.
955,543.
Patented Apr. 19, 1910.
6 SHEETS—SHEET 4.
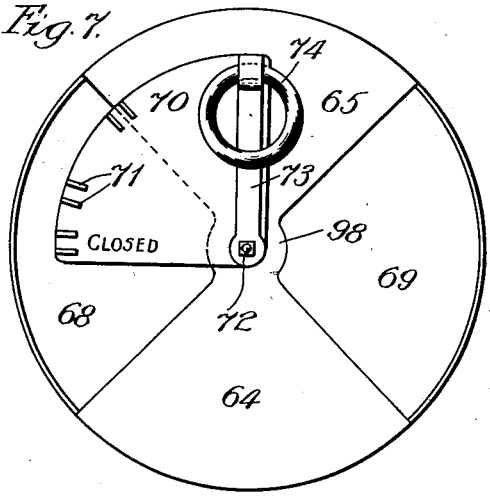
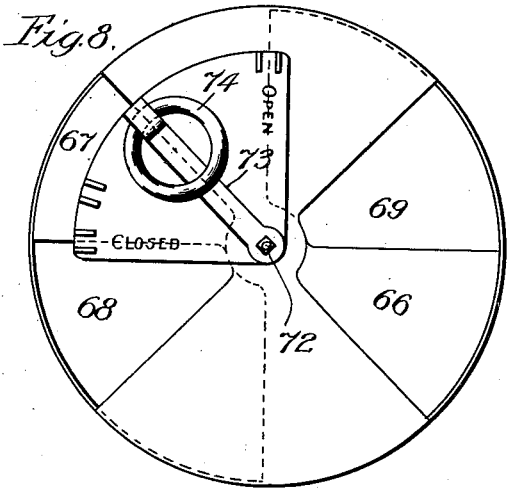
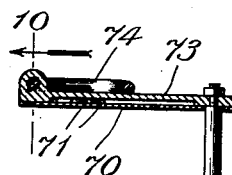
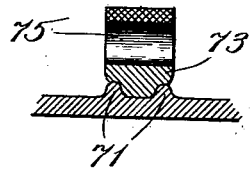
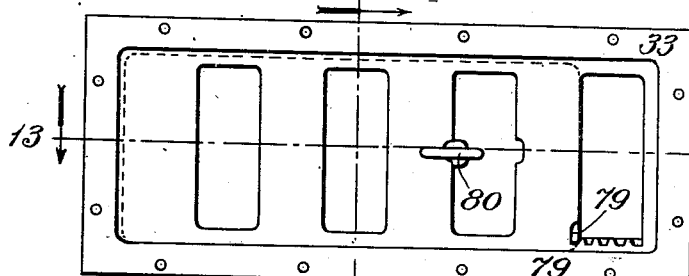
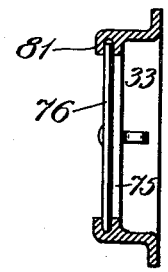
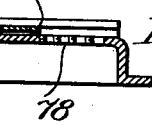
Witnesses:
John Endyre
Chas. H. Buell
Inventor:
Edward Posson
By Sheridan & Wilkinson
Attys.

E. POSSON.
CAR VENTILATOR.
APPLICATION FILED FEB. 28, 1908.

955,543.

Patented Apr. 19, 1910.
6 SHEETS—SHEET 5.

Witnesses:
John Enders
Chas. H. Buell

Inventor:
Edward Posson
By Sheridan & Wilkinson
Attys.

E. POSSON.
CAR VENTILATOR.
APPLICATION FILED FEB. 28, 1908.
955,543.
Patented Apr. 19, 1910.
6 SHEETS—SHEET 6.
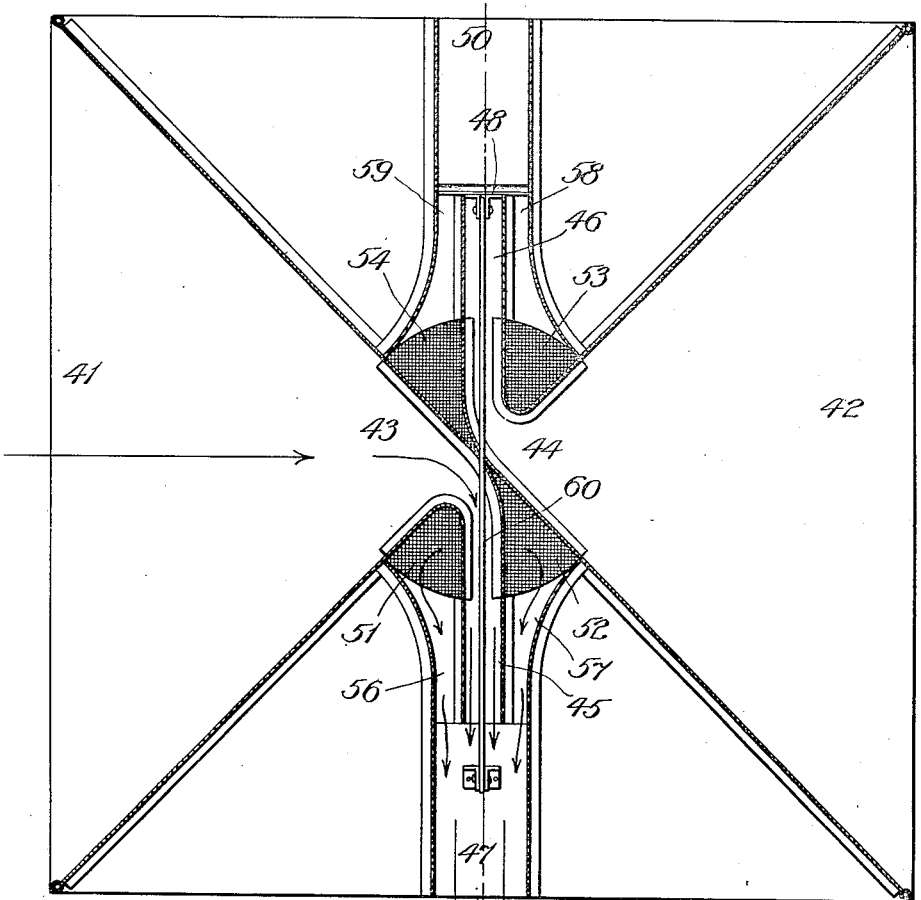
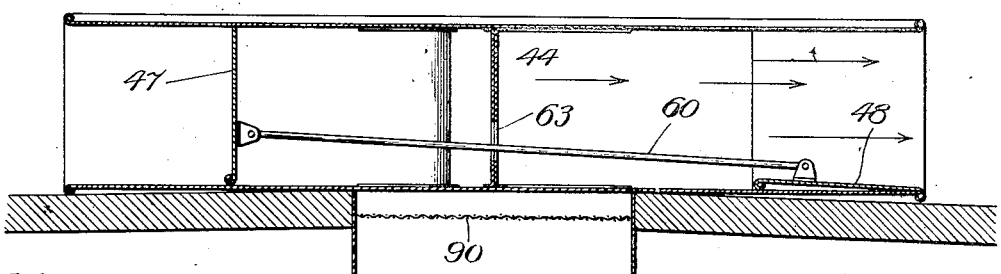
Witnesses:
John Enders
Chas. H. Buell
Inventor:
Edward Posson
By Sheridan & Wilkinson
Attys.

UNITED STATES PATENT OFFICE.

EDWARD POSSON, OF CHICAGO, ILLINOIS.

CAR-VENTILATOR.

955,543.  Specification of Letters Patent.  Patented Apr. 19, 1910.

Application filed February 28, 1908. Serial No. 418,328.

*To all whom it may concern:*

Be it known that I, EDWARD POSSON, a citizen of the United States, residing at Chicago, in the county of Cook and State of Illinois, have invented certain new and useful Improvements in Car-Ventilators, of which the following is a specification.

The object of my invention is to provide an improved ventilator adapted for use on railway cars.

It is also my object to provide a ventilator that shall be operated by the movement of the car through the outside air.

These objects and others will be made apparent in the following specification and claims, taken in connection with the accompanying drawings, in which—

Figure 3:
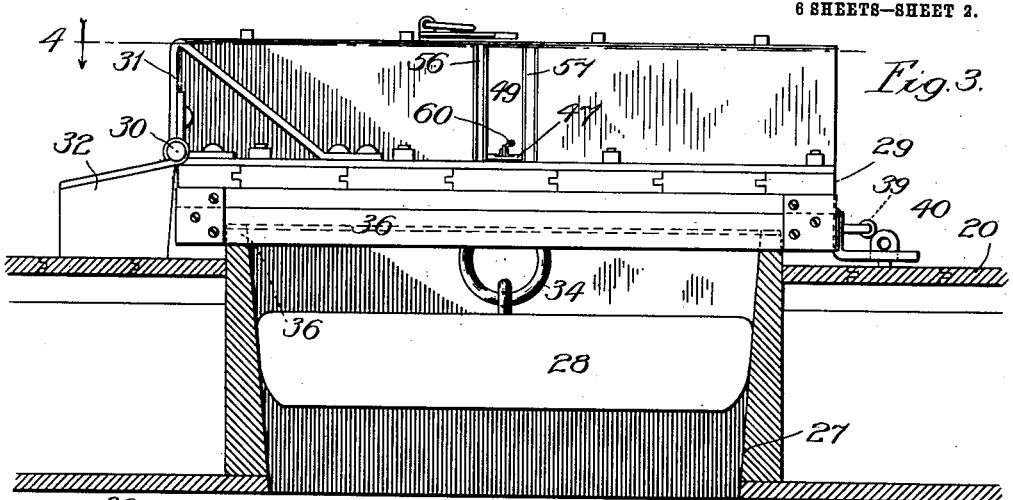
Figure 4:
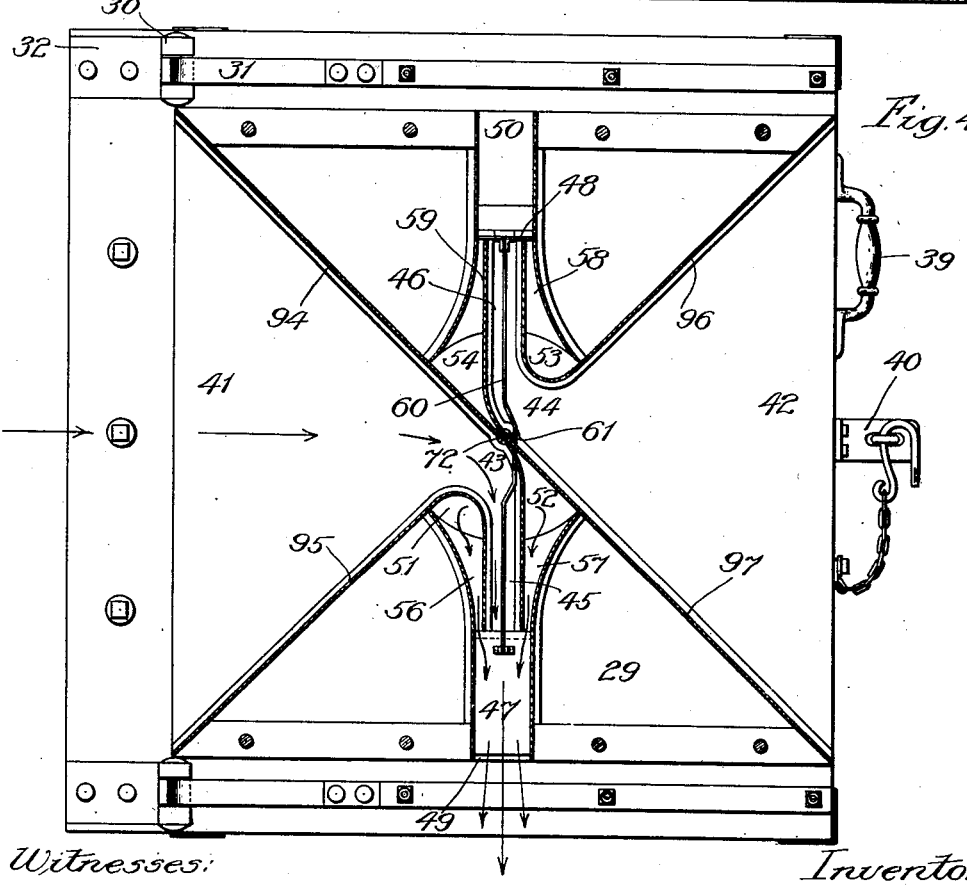
Figure 14:
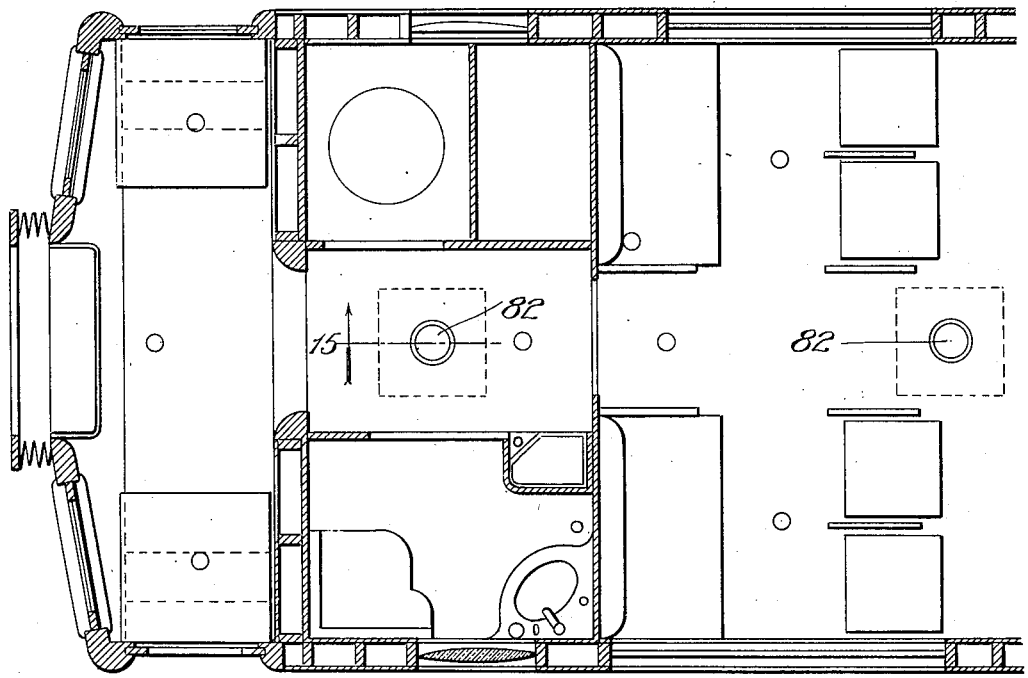
Figure 15:
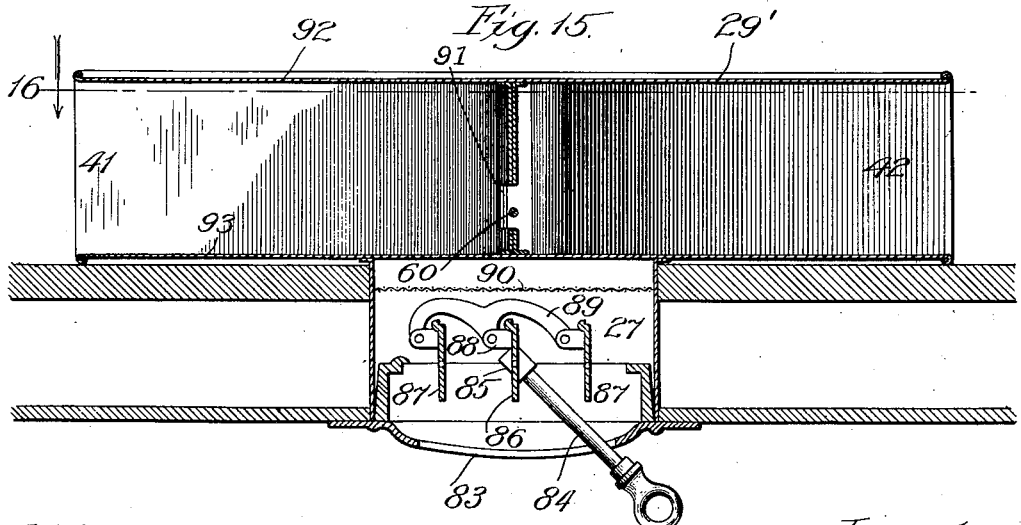

Figure 1 is a top plan view of an ordinary refrigerator car, showing my invention applied thereto. Fig. 2 is a longitudinal section taken on the line 2, 2 of Fig. 1. Fig. 3 is an elevation of the ventilator, certain of the parts being shown in section, as indicated by the line 3 in Fig. 1. Fig. 4 is a sectional plan view of the ventilator, the section being taken on the line 4 in Fig. 3. Fig. 5 is a transverse section of the ventilator, the section being taken on the line 5 in Fig. 1. Fig. 6 is an elevation of a detail. Fig. 7 is a top plan view of the damper. Fig. 8 shows the parts of Fig. 7 in a different relative position. Fig. 9 is a sectional elevation of the damper and its operating handle and shaft. Fig. 10 is a section on the line 10 of Fig. 9. Fig. 11 is an elevation of an auxiliary damper, which is shown in its relation to the other parts in Fig. 2. Figs. 12 and 13 are sections taken on the correspondingly numbered lines in Fig. 11. Fig. 14 is a sectional plan view of a passenger coach, showing my invention applied thereto. Fig. 15 is a longitudinal section taken on the line 15 of Fig. 14. Fig. 16 is a sectional plan view taken on the line 16 of Fig. 15. Fig. 17 is a transverse section of the passenger car ventilator taken on the line 17 of Fig. 16.

The reference numerals 20 and 21 refer, respectively, to the roof and running board of a refrigerator car. Underneath the running board 21, a pair of longitudinal channels 22 and 22ª extend from the end of the car, one of them going to near the middle and the other a less distance, where they turn downwardly and open into the car, as indicated by the reference numerals 23 and 23ª. Similar channels extend from the other end of the car, but are not shown in the drawings. At the end, these channels 22 turn sidewise, as indicated by the reference numeral 24. The ice boxes 25 at each end of the car are separated from the main interior of the car by the partitions 26. The opening or hatchway 27 extends upwardly from the compartment 25 and through this opening the ice may be dropped down into said compartment. A closure or plug 28 is provided which fits tightly into the passage 27, the walls of the latter converging downward. This plug 28 has handles 34 by which it may be raised and lowered and is secured from being lost or removed to a distance by means of the chain 35.

The reference numeral 29 refers generally to the outer hood or cover for the passage 27. This has the shape of a rectangular box and is hinged at 30. Adjacent to the hinge are braces 31 on the hood which coact with blocks or stops 32 on the car to prevent the hood 29 from opening back more than is desirable. These parts and their relation are clearly shown in Fig. 2.

The reference numeral 33 indicates generally an opening provided with a damper by which the branch passages 24, previously referred to, lead into the passage 27 above the plug 28 and below the hood 29. The hood 29 has a lip or flange all around its lower edge and within this is a soft packing material 37. Around the upper edge of the opening 27 is a projecting lip 38 on which the said packing 37 rests, thus giving the hood 29 a tight fit over the passage 27. On the opposite side of the hood from the hinges 30 is a handle 39, and also a locking device 40, by which the hood may be locked in closed position.

Referring more particularly to Fig. 4, it is to be observed that the hood 29 has the form of a rectangular box, the front and rear sides of which are open as indicated by the reference numerals 41 and 42. Within the box 29 are vertical partitions 94, 95, 96 and 97, which converge in pairs from the sides of the respective openings 41 and 42 toward the center of the box. Thus, extending from the opening 41 there is a passage which converges to the point 43, at which point the side walls are so deflected that the passage is continued at right angles into the part designated as 45. Similarly, from the opening 42, the passage converges to 44 and is there turned through 46. Doors 47 and 48 are hinged horizontally across the lower edge of the openings from the respective passages 45 and 46. As shown in Fig. 4, the door 47 is opened out horizontally while the door 48 is in a vertical closed position. Beyond these doors are the respective openings 49 and 50 on the sides of the box 29. In the bottom of the box 29 there are four openings 51, 52, 53 and 54 which communicate with the space beneath, that is, with the passage 27. From the respective openings 51 and 52 the passages 56 and 57 lead alongside the passage 45 and terminate at the door 47. Similarly, from the openings 53 and 54 lead the passages 58 and 59, which terminate with the passage 46 at the door 48. The two doors 47 and 48 are connected by a link 60 which is pivoted to each. The intermediate part of this link is bent aside, as indicated by the reference numeral 61, in order to avoid the vertical rod 72, the purpose of which will be explained later. A hole 63 is cut through the partition 94—97 and through this the link 60 extends. In the bottom of the box 29 there is a circular opening 62. A damper, to be explained presently, lies across this opening and at its top the said opening connects with the openings 51, 52, 53 and 54, which have been described.

The damper which lies across the opening 62 is illustrated in Figs. 7, 8, 9 and 10. This consists of two fixed opposite quadrantal sectors 64 and 65 united by the part 98. Beneath them are two similar movable sectors 66 and 67, which are fixed to the lower end of the central shaft 72. Between the fixed sectors 64 and 65 are sector-shaped open spaces 68 and 69. On top of the box 29 a quadrant 70 is attached, its center being on the axis of the shaft 72, the latter extending vertically through the box. The edge of the quadrant 70 carries pairs of upstanding lugs 71. A crank 73 extends radially across the quadrant 70, being fixed to the aforesaid shaft 72 and having a transverse hole 75 at its outer end which carries a ring 74, whereby it may be manipulated. This crank 73 has enough flexibility so that its outer end can be lifted over the lugs 71. Thus, by shifting the crank 73 on top of the box 29, the damper 66—67 may be adjusted on the under side of said box.

Referring now particularly to Figs. 11, 12 and 13, the damper in the wall of the passage 27 will be described. The position of this damper with relation to the other parts is shown in Figs. 2 and 5, where it is indicated by the reference numeral 33. It consists of a fixed member 33 with a series of rectangular openings 75 and a sliding member 76 with corresponding openings 77 adapted to register therewith. There is a series of notches 78 at the bottom of a terminal fixed opening 75, and a lug 79 on the end of the sliding member 76 is adapted to engage one of said notches. There is a handle 80 on the sliding member 76 and the latter has enough play in its guides 81 so that the lug 79 can be lifted out of any one of the notches 78 when the sliding member 76 is shifted.

The modification illustrated in Figs. 14, 15, 16 and 17 is a ventilator specially adapted for use with a passenger coach. Fig. 14 shows how it may be placed with reference to the other parts of the coach, the ventilator being indicated by the reference numeral 82. Figs. 15, 16 and 17 have the parts corresponding to those described in connection with the earlier figures, numbered the same. In this case the damper in the vertical passage 27 is of a different type, being adapted for operation from below. A lever arm 84 hangs down through the opening 83 and is pivoted at 85. Carried integrally therewith is a damper slat 86. Similar slats 87 are held in parallelism therewith by means of the connecting link 89, which is pivotally attached to the several slats 86, 87 at points 88. Shifting the lever arm 84 opens and closes the slats 86, 87, as will be obvious. To prevent cinders or dirt from coming into the passenger coach, if from any cause there should be a transient down draft through the ventilator, a screen or network 90 is provided above the damper. In this modification the rod 60 is straight, the partition being slightly offset, as indicated by the reference numeral 91, to give an opening therethrough. The box or hood 29' is shown as stationary in this case, there being no need to open it back as there is when it forms the door for the ice chamber of a refrigerator car. Its top and bottom walls are 92 and 93, respectively.

Referring to either modification, when the car is traveling along the track at any considerable speed, the air will be caught in the forward opening 41 or 42 and will draw back through the passage 43—45 or the passage 44—46, according to the direction of travel. If the door 47 or 48 at the end of the passage happens to be closed, the pressure of the air will open it and in so doing will close the door at the end of the opposite passage by means of the link 60. Thus, referring more particularly to Fig. 4, supposing the train to be traveling to the left, the air will rush through the passage 41—43—45, discharging from the opening 49. As it issues from the end of the passage 45, it will tend to draw the air out of the adjacent passages 56 and 57 by an ejector action, and thus the air will be drawn into the last named passages, up from below through the openings 51 and 52. In the case of the refrigerator car illustrated in Figs. 1 and 2, the air will be drawn along the conduits 22 from the interior of the car. In the case of the passenger car, the air will be drawn from under the car ceiling adjacent to the ventilator.

When it is desired to put ice in the ice chambers 25, the ventilator hood 29 may be turned back, the closure 28 removed and thus the passage 27 to the ice chamber is free and unobstructed. Either or both of the dampers illustrated in Figs. 7 to 12 inclusive may be employed. It will be understood that the damper 33 can be adjusted only when the ventilator hood 29 is thrown back, while the other ventilator can be adjusted from the top 92 of the hood 29. After filling the ice chamber, the hatch covers can be sealed down, thus making it impossible for pilferers to get through the hatchways to the interior of the car. All necessary adjustment of the damper can be made from the outside by means of the handle 73—74. In the passenger coach ventilator only one damper is provided, that being shown in Fig. 15.

It will be seen that I have provided a ventilator for refrigerator cars which draws the air from the body of the car. Thus, the air which flows into the car to take the place of that drawn out has a tendency to come from the ends, where it is cooled by the ice. But my ventilator is of wider application, including its use on a passenger car, as shown. Stated broadly, my ventilator comprises two conduits, one having both ends open to the atmosphere and adapted to have a current set up therein by movement through the surrounding air, the other leading from the car and so combined with the first conduit as to constitute an ejector. The first conduit is 41—43—45. The second conduit is 51—56.

What I claim is:

1. A ventilator comprising a hood with two oppositely directed openings, opposite conduits leading therefrom at right angles to the direction of said openings, doors for the ends of said conduits, and means whereby one door must open when the other closes, and vice versa.

2. A ventilator adapted to go on top of a chamber to be ventilated, comprising a hood with two oppositely directed openings, conduits converging from said openings and thereafter being extended laterally, other conduits leading from the chamber and terminating beside the ends of the said laterally extending conduits, and means for closing one set of conduits when the other is open, and vice versa.

3. A ventilator for a refrigerator car, comprising a duct leading from the interior of the car along the roof to the end thereof, a hatchway in the end of the roof into which said duct opens, a plug for the hatchway below the point of opening of said duct, and a ventilator cover for the hatchway.

4. In a refrigerator car, an ice chamber at the end, a hatchway leading through the roof to the ice chamber, a duct branching laterally from the hatchway and extending thence to the interior of the car, a plug in the hatchway below said duct, and a hooded cover for said hatchway comprising ejector means, whereby the movement of the car with relation to the surrounding air will draw the air from the car through said duct.

5. In a refrigerator car, an ice chamber at the end, a hatchway leading through the roof to said ice chamber, a duct leading from the side of the hatchway to the interior of the car, an adjustable damper in the hatchway across the said duct, a plug in the hatchway below the duct, and an ejector ventilator cover for the hatchway.

6. In a car, a hatchway through the roof and a cover therefor, said cover comprising an ejector ventilator adapted to be actuated by an air current produced by the movement of the car with relation to the surrounding air, an opening through the under side of the cover from the hatchway to the ventilator, an adjustable damper over said opening, a handle on top to control said damper, and connections from the handle to the damper.

7. A rectangular box adapted to be placed on a car roof, comprising two independent ventilators for the car, each being adapted to be operated by the movement of the car in one of two opposite directions, and automatic means for rendering one ventilator operative and the other inoperative in accordance with the direction in which the car is traveling.

8. In a refrigerator car, a hatchway at each side of each end of the car roof, ducts of different length leading from the different hatchways toward the center of the car, and ventilator covers for the hatchways.

9. A car ventilator comprising a hood adapted to be placed on top of a car roof and having two oppositely directed openings extending in the longitudinal direction of the car, opposite conduits converging from each opening toward the center, these conduits being each turned aside in opposite directions at right angles, and conduits from the interior of the car joining these conduits at intermediate points.

10. A ventilator adapted to go on top of a chamber to be ventilated, comprising a hood with two oppositely directed openings, conduits converging from said openings and thereafter being extended laterally in opposite directions to one another, and other conduits leading from the chamber and terminating beside the ends of the said laterally extending conduits.

EDWARD POSSON.

Witnesses:
 CARL A. RICHMOND,
 ANNA L. SAVOIE.